UNITED STATES PATENT OFFICE.

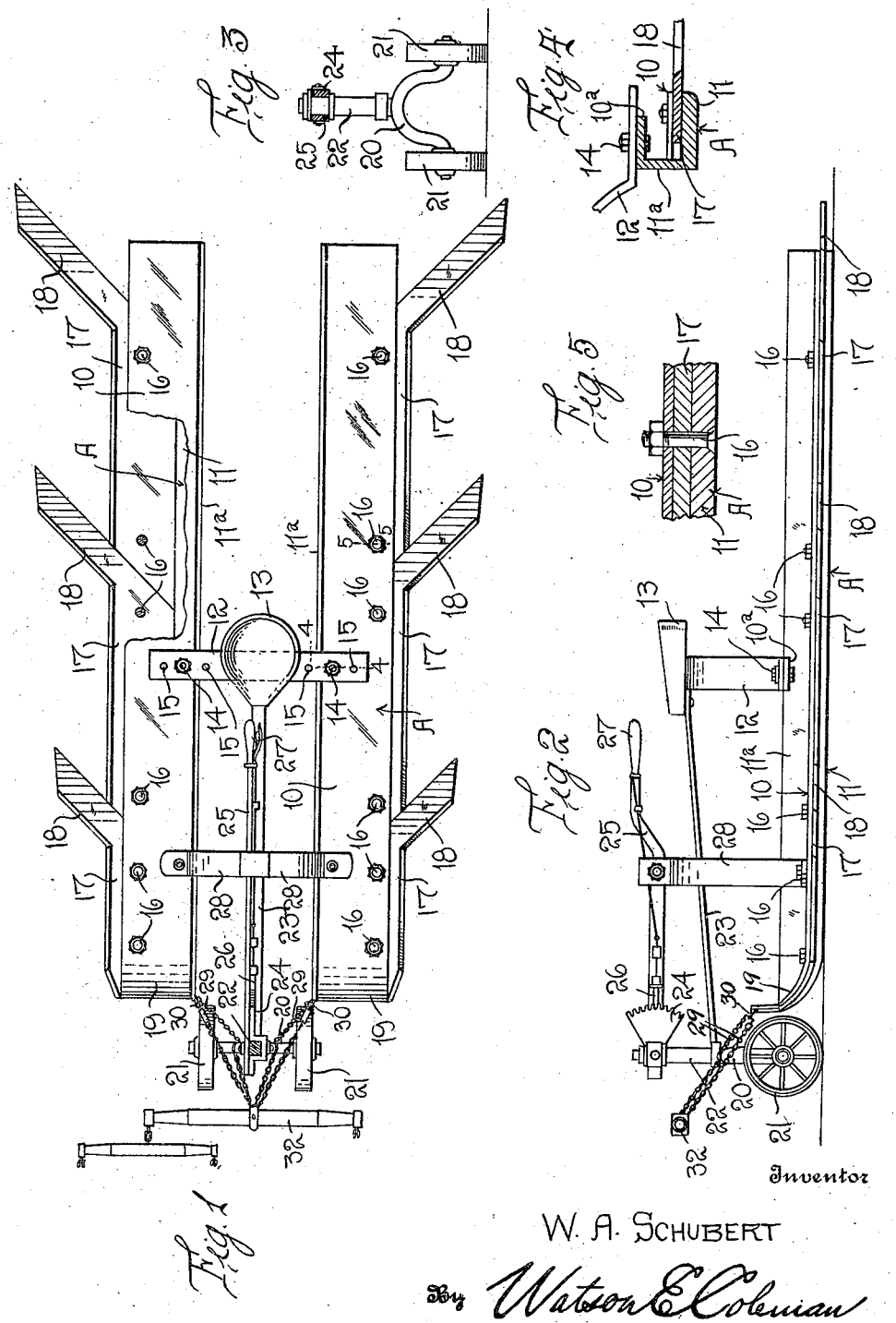

WILLIAM A. SCHUBERT, OF HANSFORD, TEXAS.

WEED-CUTTING MACHINE.

1,244,646.  Specification of Letters Patent.  Patented Oct. 30, 1917.

Application filed March 3, 1917. Serial No. 152,334.

*To all whom it may concern:*

Be it known that I, WILLIAM A. SCHUBERT, a citizen of the United States, residing at Hansford, in the county of Hansford and State of Texas, have invented certain new and useful Improvements in Weed-Cutting Machines, of which the following is a specification, reference being had to the accompanying drawings.

This invention relates to agricultural implements, and particularly to means for cutting, and thereby eradicating, weeds.

The general object of the invention is to provide a machine of this character particularly adapted to be used for cutting weeds over ground which has been "listed" by the use of lister plows.

Another object of the invention is to provide means for this purpose comprising a pair of runners spaced from each other and having outwardly and rearwardly projecting knives, the runners being adapted to straddle or operate on each side of a row and said runners being adjustable toward or from each other so as to accommodate the machine to rows of various widths.

A further object of the invention is to provide means whereby the forward ends of the runners may be raised or lowered to suit the work being done.

Still another object is to provide a machine of this character by which the cutting knives may be readily attached or detached.

Other objects will appear in the course of the following description.

The invention is illustrated in the accompanying drawings, in which:

Figure 1 is a top plan view of my improved weed cutter;

Fig. 2 is a side elevation thereof;

Fig. 3 is a front elevation of the front axle, the bars 24 and 25 being in section;

Fig. 4 is a fragmentary sectional view on the line 4—4 of Fig. 1;

Fig. 5 is a fragmentary sectional view through the lower member of the runner, the shank on one of the knives and the upper member of a runner.

Referring to these figures, it will be seen that my improved weed cutting machine comprises the runners A. There are two of these runners spaced from each other and each runner comprises an upper longitudinal plate or metallic bar 10 and a lower metallic plate or bar 11, the lower bar 11 being relatively thick, inasmuch as it bears upon the surface of the ground and, therefore, has to stand the wear incident to the friction with the ground.

The runners are disposed in spaced relation to each other by means of a rear arch 12, which also supports the seat 13, this rear arch at its lower ends being laterally turned so as to rest flat upon the runners and particularly against the brackets 10$^a$ (see Fig. 4) and to be fastened thereto by bolts 14, or other suitable means. It will be seen that the laterally turned ends of the arch 12 are provided with a plurality of openings 15 through which one of the bolts 14 may pass and that thus the runners may be laterally adjusted with relation to each other. The upper and lower plates of each runner may also be held in proper position by bolts 16, which pass through the shanks 17 of knives 18 and these bolts 16 and the bolts 14 are to have their heads countersunk in the underface of the bars or plates 11, so as to eliminate or reduce friction with the ground. The forward ends of the runners are upwardly turned, as at 19.

Disposed in line between the runners, but in advance of the runners at the forward end of the machine, is an arched axle 20 upon which are mounted the wheels 21 and extending up from the axle is a standard or stem 22. This standard is operatively connected to a rearwardly extending bar 23 which at its rear end is attached to the rear arch 12 beneath the seat. This bar 23 extends upward and rearward. Also operatively mounted upon the stem 22 is a sector rack 24 and pivotally connected to the stem 22 in any suitable manner is a lever 25 which extends rearward into a position adjacent to the seat 13, this lever carrying a detent bolt 26 operatively connected to the hand grip 27, which hand grip is operatively connected to the bolt in any usual or suitable manner. Attached to the runners at their forward ends are the upwardly and inwardly extending brackets 28 which at their upper ends are attached to the lever 25 so that when the lever 25 is raised, it will raise the forward ends of the runners relative to the wheels 21 and when the lever is depressed, the forward ends of the runners will be depressed relative to the wheels. This construction permits the depth of cut of the knives 18 to be regulated or permits the forward portion of the runners to be raised so that the forward portion of the machine will travel upon the wheels 21. These front wheels 21 help to guide the machine when operating, as they travel in the furrow and have a tendency to steady the machine.

Draft chains may be connected to the runners 19 by means of springs and shackles 30, these draft chains extending to the swingletree 32. No tongue need be used with this machine. Chains 29 are also connected to the stem 22 of the arched axle 20 and extend rearward to the runners.

The knives 18 slant rearward and outward from the knife shanks 17. These knives must be sharpened or beveled downward and formed to provide a cutting edge and the outer edges of the shanks 17 are also sharpened. These knives are to be made of good quality steel and the front knife is, in practice, a foot long, the second knife 1½ feet long and the third or rearmost knife, two feet long. While I have illustrated three knives, it will be understood that I may use a greater number of knives, but that all of the knives will progressively increase in length rearward. The knives should be turned up so as not to run too deep into the ridges and each knife is preferably fastened by two bolts.

While I have illustrated a construction which I believe to be very efficient for the purposes intended and which may be cheaply manufactured and is easily operated, yet I do not wish to limit myself to the exact details shown, as these may be changed in many ways, without departing from the spirit of the invention, as defined in the appended claims.

Thus, for instance, I have illustrated, as in Fig. 4, the lower member 11 as being formed with upwardly extending lateral flanges 11ª from which the bearings 10ª project, but it is obvious that I do not wish to be limited to this construction.

It will be seen that the runners are to all intents and purposes pivoted to the ends of the brackets 28 so that runners may be shifted into or out of a parallel relation and may be disposed in a divergent relation. The wheels 21 are needed in turning at the ends of the row so the knives 18 will not dig into the ground and also needed in going from field to field so that the front end of the machine may be raised sufficiently to escape the ground it being understood that the driver leaves the seat when he adjusts the lever 25 to raise or lower the runners relative to the wheels 21. The rear ends of the runners can drag on the ground. The runners are to be raised with their forward ends entirely off of the ground by operating the lever 25 at the ends of the furrows or when going from field to field. Normally the runners will be set close to the ground so that the knives will cut the weeds as close to the ground as possible. The knives should be turned upward a slight degree to prevent running too deep in ridges.

Having thus described my invention, what I claim is:—

1. In a machine of the character described, spaced runners having laterally projecting cutting knives, means connecting the runners and spacing them from each other, a wheeled truck extending upward from the runners and having an upwardly extending stem, draft devices operatively connected to the runners, a lever operatively mounted on the stem, and brackets attached to the runners and to the lever and means for locking the lever in any raised or depressed position.

2. In a machine of the character described, a pair of spaced runners, each runner comprising an upper plate and a lower plate, means operatively connecting the runners and spacing them from each other, and permitting the adjustment of the runners toward or from each other, and knives carried upon said runners and projecting laterally and rearwardly therefrom, said knives having shanks disposed between the upper and lower plates of the runners and detachably connected thereto, said knives increasing in length progressively from the front to the rear of the machine.

3. In a machine of the character described, a pair of parallel spaced runners having their forward ends turned upward, each runner comprising an upper plate and a lower plate, knives having angular shanks disposed between the plates, the outer edge and the forward edge of each knife being beveled, an arched seat supporting member attached to the runners and operatively connected at its ends to the runners for lateral adjustment of the runners, a seat supported on the arch, a forward truck having an arched axle and an upwardly extending stem, draft devices connected to the runners, a lever operatively connected to the stem and extending rearward nearly to the seat, brackets pivoted at their outer ends each to one of the runners and at their inner ends operatively connected to the lever, a sector-shaped rack operatively attached to the stem, and manually operable means connected to the lever for locking it to the rack.

In testimony whereof I hereunto affix my signature in the presence of two witnesses.

WILLIAM A. SCHUBERT.

Witnesses:
A. F. BARKLEY,
R. L. THOM.